United States Patent [19]
Rock et al.

[11] Patent Number: 5,106,915
[45] Date of Patent: Apr. 21, 1992

[54] FLAME RESISTANT POLYETHERIMIDE RESIN BLENDS

[75] Inventors: John A. Rock, Becket, Mass.; L. Joseph Male, Old Chatham, N.Y.; Norman E. Durfee, Jr., Lansboro, Mass.

[73] Assignee: General Electric Company, Pittsfield, Mass.

[21] Appl. No.: 742,556

[22] Filed: Aug. 8, 1991

Related U.S. Application Data

[63] Continuation of Ser. No. 607,207, Nov. 2, 1990, abandoned, which is a continuation of Ser. No. 374,555, Jul. 3, 1989, abandoned, which is a continuation of Ser. No. 225,636, Jul. 27, 1988, abandoned, which is a continuation of Ser. No. 925,916, Nov. 3, 1986, abandoned.

[51] Int. Cl.$^5$ ............................................. C08L 79/08
[52] U.S. Cl. ................................. 525/431; 525/432; 525/436
[58] Field of Search ................. 525/431, 432, 436

[56] References Cited

U.S. PATENT DOCUMENTS

| | | | |
|---|---|---|---|
| 3,740,305 | 6/1973 | Hoback et al. | 161/183 |
| 3,847,867 | 11/1974 | Heath et al. | 260/47 |
| 3,972,902 | 8/1976 | Heath | 260/346.3 |
| 3,983,093 | 9/1976 | Williams et al. | 260/47 CP |
| 4,011,279 | 3/1977 | Berger et al. | 260/824 R |
| 4,051,163 | 9/1977 | Berger et al. | 260/448.2 N |
| 4,387,193 | 6/1983 | Giles, Jr. | 525/431 |
| 4,417,044 | 11/1983 | Parekh | 528/179 |
| 4,468,506 | 8/1984 | Holub et al. | 525/432 |
| 4,548,997 | 10/1985 | Mellinger et al. | 525/433 |
| 4,558,110 | 12/1985 | Lee | 528/26 |
| 4,586,997 | 6/1986 | Lee | 525/426 |

*Primary Examiner*—Ana L. Carrillo
*Attorney, Agent, or Firm*—Rothwell, Figg, Ernst & Kurz

[57] ABSTRACT

Flame resistant polymer blends contain a polyetherimide and an impact strength-enhancing amount of a siloxane-polyetherimide copolymer. These blends exhibit high impact strengths, good blow-moldability and injection moldability, amenability to thermoforming and very low flammability. The blends are particularly suited to the manufacture of aircraft cabin interior components.

15 Claims, No Drawings

FLAME RESISTANT POLYETHERIMIDE RESIN BLENDS

This is a continuation of application Ser. No. 07/607,207, filed Nov. 2, 1990, now abandoned, which is a continuation of application Ser. No. 374,555, filed July 3, 1989, which is a continuation of Ser. No. 225,636, filed July 27, 1988, now abandoned, which is a continuation of Ser. No. 925,916, filed Nov. 3, 1986, now abandoned.

BACKGROUND OF THE INVENTION

This invention relates to polymer blends which are characterized by high impact strengths, good blow-moldability, good injection moldability, amenability to thermoforming and very low flammability. The polymer blends are particularly suited for the construction of various panels and parts for aircraft interiors.

Because of their light weight, durability and strength, engineering thermoplastics are used for the construction of many components of aircraft interiors. Components such as wall panels, overhead storage lockers, serving trays, seat backs, cabin partitions and the like are conveniently and economically fabricated by extrusion, thermoforming, injection molding and blow-molding techniques. The thermoplastic resins used in these components, therefore, should be amenable to such fabrication techniques.

Recent attention to the effects of fire and smoke on survivability during aircraft mishaps has led to the promulgation of standards for the flame resistance of construction materials used for the interiors of transport category aircraft. One drawback of engineering thermoplastics conventionally used for the construction of aircraft interior components is their inability to meet the latest flammability performance standards.

Such standards are embodied in 1986 amendments to Part 25-Airworthiness Standards-Transport Category Airplanes of Title 14, Code of Federal Regulations. (See 51 *Federal Register* 26206, July 21, 1986 and 51 *Federal Register* 28322, Aug. 7, 1986.) The flammability standards are based on heat calorimetry tests developed at Ohio State University. Such tests are described in the above-cited amendments to 14 C.F.R. Part 25 and are incorporated herein by reference.

Heretofore, no conventional engineering thermoplastics, having the requisite physical properties and processing characteristics, have been able to meet the flammability standards referred to in the preceeding paragraph.

SUMMARY OF THE INVENTION

In accordance with the present invention, polymer blend compositions contain a polyetherimide and an impact strength-enhancing amount of siloxane polyetherimide copolymer.

The polymer blends of this invention have been found to possess the physical properties important for applications as aircraft cabin interior components. Moreover, these blends meet or exceed the rigorous flammability standards that have been established for such aircraft interior components.

DETAILED DESCRIPTION OF THE INVENTION

The polyetherimides employed in the blends of this invention are well-known injection moldable engineering thermoplastics. Polytherimides are characterized by high impact strengths, high temperature resistance and good processability. Unmodified polyetherimides have not, however, found widespread use in blow-molding applications.

The polyetherimides used for preparing the blends of this invention contain repeating groups of the formula

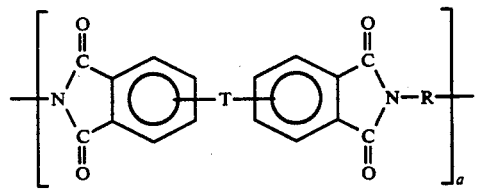

wherein "a" is an integer greater than 1, e.g., from 10 to 10,000 or more; T is —O— or a group of the formula

wherein the divalent bonds of the —O— or the —O—Z—O— group are in the 3,3'; 3,4'; 4,3', or the 4,4'positions; Z is a member of the class consisting of (A):

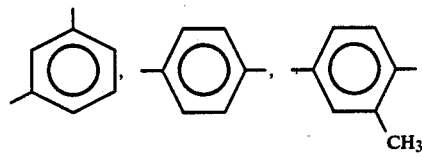

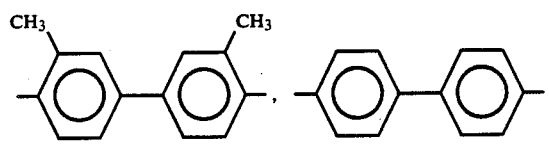

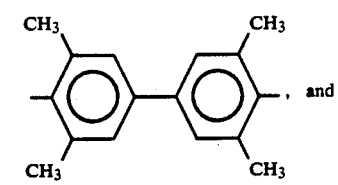

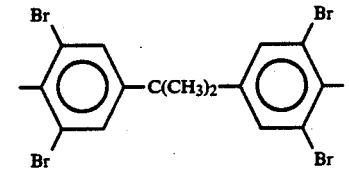

and (B) divalent organic radicals of the general formula

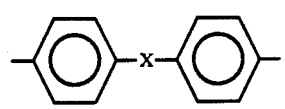

where X is a member selected from the group consisting of divalent radicals of the formulas

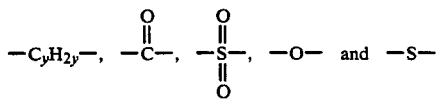

where y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbons atoms, cycloalkylene radicals having from 3 to about 20 carbon atoms, and (c) divalent radicals of the general formula

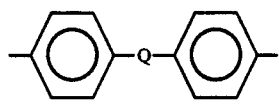

where Q is a member selected from the group consisting of

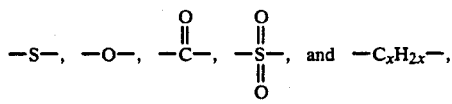

and x is an integer from 1 to about 5.

In one embodiment, the polyetherimide may be a copolymer which, in addition to the etherimide units described above, further contains polyimide repeating units of the formula

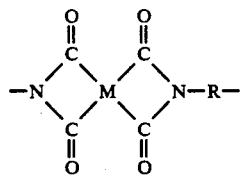

wherein R is as previously defined and M is selected from the group consisting of

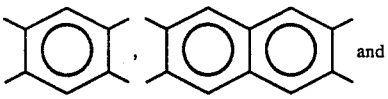

where B is —S— or

These polyetherimide copolymers and their preparation are described by Williams et al. in U.S. Pat. No. 3,983,093, incorporated herein by reference.

The polyetherimides can be prepared by any of the methods well known to those skilled in the art, including the reaction of an aromatic bis(ether anhydride) of the formula

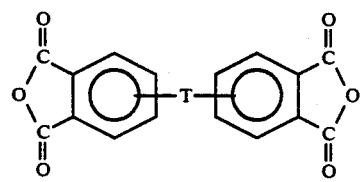

(I)

with an organic diamine of the formula $H_2N—R—NH_2$ (II)

wherein T and R are defined as described above.

Bis(ether anhydride)s of formula I include, for example,
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride; and
1,4-bis(3,4-dicarboxyphenoxy)benzene dianhydride;
4,4'-bis(phthalic anhydride)ether.

A preferred class of aromatic bis(ether anhydride)s included by formula I includes compounds of formula III, IV and V, which follow:

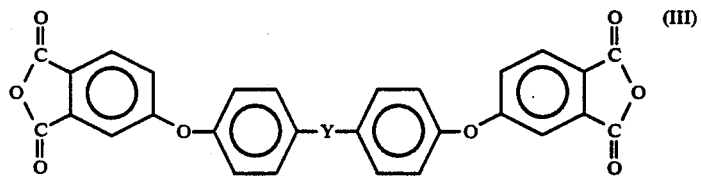

(III)

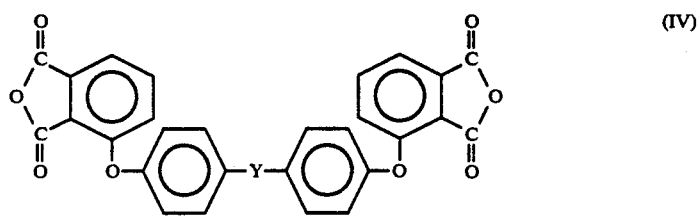

(IV)

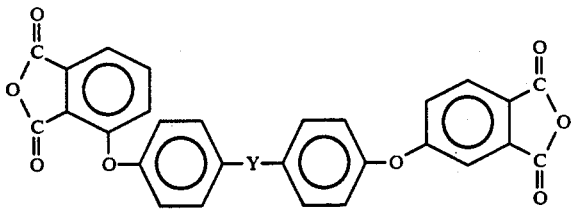

and mixtures thereof, where Y is selected from the group consisting of —O—, —S—,

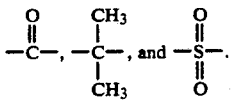

Aromatic bis(ether anhydride)s of formula III include, for example:
- 2,2-bis[4-(3,4-dicarboxyphenoxy)phenyl]propane dianhydride;
- 4,4'-bis(3,4-dicarboxyphenoxy)diphenyl ether dianhydride;
- 4,4'-bis(3,4-dicarboxyphenoxy)diphenyl sulfide dianhydride;
- 4,4'-bis(3,4-dicarboxyphenoxy)benzophenone dianhydride;
- 4,4'-bis(3,4-dicarboxyphenoxy)diphenyl sulfone dianhydride; and mixtures thereof.

Aromatic bis(ether anhydride)s of formula IV include, for example:
- 2,2-bis([4-(2,3-dicarboxyphenoxy)phenyl]propane dianhydride;
- 4,4'-bis(2,3-dicarboxyphenoxy)diphenyl ether dianhydride;
- 4,4'-bis(2,3-dicarboxyphenoxy)diphenyl sulfide dianhydride;
- 4,4'-bis(2,3-diacarboxyphenoxy)benzophenone dianhydride;
- 4,4'-bis(2,3-dicarboxyphenoxy)diphenyl sulfone dianhydride; and mixtures thereof.

The aromatic bis(ether anhydride)s of formula V may be, for example,
- 4-(2,3-dicarboxyphenoxy)-4'-(3,4-dicarboxyphenoxy) diphenyl-2,2-propane dianhydride.
- 4-(2,3-dicarboxyphenoxy)-4'-(3,4-dicarboxyphenoxy) diphenyl ether dianhydride;
- 4-(2,3-dicarboxyphenoxy)-4'-(3,4-dicarboxyphenoxy) diphenyl sulfide dianhydride;
- 4-(2,3-dicarboxyphenoxy)-4'-(3,4-dicarboxyphenoxy) benzophenone dianhydride;
- 4-(2,3-dicarboxyphenoxy)-4'-(3,4-dicarboxyphenoxy) diphenyl sulfone dianhydride, and mixtures thereof.

When polyetherimide/polyimide copolymers are employed, a dianhydride, such as pyromellitic anhydride, is used in combination with the bis(ether anhydride).

Some of the aromatic bis(ether anhydride)s of formula (I) are shown in U.S. Pat. No. 3,972,902 (Darrell Heath and Joseph Wirth). As described therein, the bis(ether anhydride)s can be prepared by the hydrolysis, followed by dehydration, of the reaction product of a nitrosubstituted phenyl dinitrile with a metal salt of dihydric phenol compound in the presence of a dipolar, aprotic solvent.

Additional aromatic bis(ether anhydride)s also included by formula (I) above are shown by Koton, M. M., Florinski, F. S., Bessonov, M. I. and Rudakov, A. P. (Institute of Heteroorganic Compounds, Academy of Sciences, U.S.S.R), U.S.S.R. patent 257,010, Nov. 11, 1969, Appl. May 3, 1967, and by M. M. Koton, F. S. Florinski, Zh. Org. Khin. 4(5), 774 (1968).

The organic diamines of formula (II) include, for example:
- m-phenylenediamine,
- p-phenylenediamine,
- 4,4'-diaminodiphenylpropane,
- 4,4'-diaminodiphenylmethane (commonly named 4,4'-methylenedianiline),
- 4,4'-diaminodiphenyl sulfide,
- 4,4'-diaminodiphenyl sulfone,
- 4,4'-diaminodiphenyl ether (commonly named 4,4'-oxydianiline),
- 1,5-diaminonaphthalene,
- 3,3-diamethylbenzidine,
- 3,3-dimethoxybenzidine,
- 2,4-bis(beta-amino-t-butyl)toluene,
- bis(p-beta-amino-t-butylphenyl)ether,
- bis(p-beta-methyl-o-aminophenyl)benzene,
- 1,3-diamino-4-isopropylbenzene,
- 1,2-bis(3-aminopropoxy)ethane,
- benzidine,
- m-xylylenediamine,
- 2,4-diaminotoluene,
- 2,6-diaminotoluene,
- bis(4-aminocyclohexyl)methane,
- 3-methylheptamethylenediamine,
- 4,4-dimethylheptamethylenediamine,
- 2,11-dodecanediamine,
- 2,2-dimethylpropylenediamine,
- octamethylenediamine,
- 3-methoxyhexamethylenediamine,
- 2,5-dimethylhexamethylenediamine,
- 2,5-dimethylheptamethylenediamine,
- 3-methylheptamethylenediamine,
- 5-methylnonamethylenediamine,
- 1,4-cyclohexanediamine,
- 1,12-octadecanediamine,
- bis(3-aminopropyl)sulfide,
- N-methyl-bis(3-aminopropyl)amine,
- hexamethylenediamine,
- heptamethylenediamine,
- nonamethylenediamine,
- decamethylenediamine, and mixtures of such diamines.

Preferred polyetherimides are available commercially from General Electric Company, Pittsfield, Mass. U.S.A. under the registered trademark, ULTEM.

The siloxane polyetherimide copolymers employed in the blends of this invention may be prepared in a manner similar to that used for polyetherimides, except that a portion or all of the organic diamine reactant is replaced by an amine-terminated organosiloxane of the formula

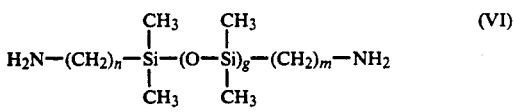

wherein n and m independently are integers from 1 to about 10, preferably from 1 to about 5, and g is an integer from 1 to about 40, preferably from about 5 to about 25.

The organic diamine of formula II and the amine-terminated organosiloxane of formula VI may be physically mixed prior to reaction with the bis(ether anhydride)(s), thus forming a substantially random copolymer. Alternatively, block or alternating copolymers may be used.

Preferred amine-terminated organosiloxanes are those of the formula VI, in which n and m are each 3, and which have a molecular weight distribution such that g has an average value ranging from about 9 to about 20.

The diamine component of the siloxane polyetherimide copolymers generally contains from about 20 to 50 mole % of the amine-terminated organosiloxane of formula VI and from about 50 to 80 mole % of the organic diamine of formula II. In preferred copolymers, the diamine component contains from about 25 to about 40 mole %, most preferably about 30 mole % of the amine-terminated organosiloxane.

Both the polyetherimides and the siloxane polyetherimide copolymers used in the blends of this invention may be prepared by any of the procedures conventionally used for preparing polyetherimides. A presently preferred method of preparation is described in U.S. Pat. No. 4,417,044, which is incorporated herein by reference.

Blending a siloxane polyetherimide copolymer with a polyetherimide has been found to enhance various important physical properties of the polyetherimide. In particular, the impact strength of the blend is considerably better than that of the unmodified polyetherimide. In addition, the blend is easily fabricated into useful parts by sheet extrusion, thermoforming, injection molding and blow molding. Blow molding can be an efficient and economical procedure for mass production of certain types of components. The heat distortion temperatures (HDT) of the blends of this invention are unexpectedly high, especially in view of the rather low HDT's of unblended siloxane polyetherimide copolymers. Further unexpected advantages of the polyetherimide/siloxane polyetherimide copolymer blends of this invention are their greater resistance to crack propagation and enhanced retention of impact resistance after heat aging as compared to corresponding unmodified polyetherimides. The latter property can be important in applications requiring thermoforming.

In addition to the polymeric ingredients, the blends may contain other materials, such as fillers, additives, reinforcing agents, pigments and the like. These blends exhibit very low flammabilities. The blends meet or exceed the flammability standards of Part 25 of Title 14 of the Code of Federal Regulations. Moreover, in laboratory tests at 1/16" thickness, they were found to meet or satisfy UL 94 V-O requirements for flammability, as established by Underwriters Laboratories' "Flammability of Plastic Materials Bulletin" of Jan. 24, 1980.

The siloxane polyetherimide copolymer is employed in the present blends in impact strength-enhancing concentrations. Such concentations can vary over a fairly wide range, for example, from about 2% to about 90% by wt. of the blends, preferably, from about 2% to about 75% by wt. of the blends, most preferably from about 5% to about 30% by wt. of the blends.

Various blends have been prepared in accordance with this invention and tested for physical properties and flame resistance. The results of these tests are shown in the following examples, which are provided for illustration only and are not intended to be limiting.

EXAMPLES 1-18

Polymer blends described in Table I below were prepared by a conventional melt-blending procedure using a laboratory extruder. The blends were extruded into small diameter strands, which were chopped into pellets for further molding into test parts.

The polyetherimide resins employed in these experiments are commercially available resins, sold by General Electric Company, under the trademark, ULTEM ®. The polyetherimide identified in Table I as type A is a homopolymer prepared by reacting 2,2-bis[4-(3,4-dicarboxyphenoxy)phenyl] propane dianhydride ("BPA-DA") and m-phenylenediamine. The polyetherimide identified as type B is a copolymer prepared by reacting BPA-DA with a 50/50 mixture of m-phenylenediamine and p-phenylenediamine. The polyetherimide identified as type C is a copolymer prepared by reacting a mixture of BPA-DA and pyromellitic dianhydride with m-phenylenediamine. The polyetherimide designated type D is a lower molecular weight form of type A. The siloxane polyetherimide copolymer is the reaction product of a mixture of m-phenylenediamine and an amine-terminated organosiloxane, with BPA-DA. The siloxane polyetherimide copolymer designated in Table I as type A is a random copolymer prepared from BPA-DA and a mixture of 70 mole % m-phenylenediamine and 30 mole % of an amine- terminated organosiloxane of formula VI wherein n and m are 3 and g has an average value of 19.4. The siloxane polyetherimide copolymer designated type B is the same as type A, except that the diamine component contains 40 mole % of the amine-terminated organosiloxane and the average value of g is 9. The siloxane polyetherimide copolymer of designated type C is the same as type B, except that it is a block, rather than random, copolymer. The siloxane polyetherimide copolymer designated type D is the same as type C except that the diamine component contains 25 mole % of the amine-terminated organosiloxane and the average value of g is 15. The siloxane polyetherimide copolymer designated type E is the same as type A, except that it is a block copolymer and the average value of g is 15.

The data provided in Table I demonstrates that the blends of the present invention have unexpectedly high heat distortion temperatures, have improved impact resistance, retain their impact resistance after heat aging, and are amenable to injection molding, blow molding, extrusion and thermoforming. Moreover, these blends have low flammability and heat release values, thus making them particularly suited to aircraft interior component applications.

TABLE 1

| Example No. | Polyether-imide conc. (wt. %) | Polyether-imide type | Siloxane Polyether-imide co-polymer conc. (wt. %) | Siloxane Polyether-imide co-polymer type | Heat Deflection Temperature[1] at 264 psi (°c.) | Izod Impact[2] (ft.-lb/in.) Notched | Izod Impact[2] (ft.-lb/in.) Rev Notched | Gardner Impact (in.-lb.) As molded[3] | Gardner Impact (in.-lb.) Scribed[4] | Sheet[5] | Sheet[6] Heat Aged |
|---|---|---|---|---|---|---|---|---|---|---|---|
| 1 | 95 | A | 5 | A | 196.5 | 1.24 | 27 | 250 | — | — | — |
| 2 | 90 | A | 10 | A | 196.1 | 1.90 | 23.8 | 270 | — | — | — |
| 3 | 85 | A | 15 | A | 195.8 | 2.40 | 24.7 | >320 | — | — | — |
| 4 | 95 | A | 5 | B | 195.1 | 0.71 | >16 | — | — | — | — |
| 5 | 90 | A | 10 | B | 193.8 | 1.30 | >16 | — | — | — | — |
| 6 | 85 | A | 15 | B | 190.9 | 1.70 | >16 | — | — | — | — |
| 7 | 90 | B | 10 | B | 195.9 | 1.78 | >16 | — | — | — | — |
| 8 | 90 | C | 10 | B | 203.5 | 1.16 | >16 | — | — | — | — |
| 9 | 85 | D | 15 | B | 193.0 | 1.64 | >16 | >320 | >80>120 | — | — |
| 10 | 85 | A | 15 | B | 194.3 | 2.18 | >16 | >320 | >80 | 300 | 195 |
| 11 | 85 | A | 15 | C | 191.5 | 1.6 | — | >320 | — | — | — |
| 12 | 85 | A | 15 | D | 191.5 | 1.6 | — | >320 | — | — | — |
| 13 | 70 | A | 30 | C | 181.6 | 5.2 | — | >320 | — | — | — |
| 14 | 85 | A | 15 | E | 187.3 | 3.5 | — | — | — | — | — |
| 15 | 25 | A | 75 | C | 79.8 | 2.8 | — | — | — | — | — |
| 16 | 25 | A | 75 | E | 98.8 | 12.9 | — | — | — | — | — |
| 17 | 100 | A | 0 | — | 200.0 | 0.8 | 25 | 320 | 16 | 250 | 100 |
| 18 | 100[11] | A | 0 | — | 197.2 | 0.5 | 25.5 | — | — | — | — |

| Example No. | Dynatup ® Impact[7] (ft.-lb.) As molded | Dynatup ® Impact[7] (ft.-lb.) After >16 hrs. at 300° F. | Heat Release[8] 2 min. total heat release | Heat Release[8] Max. heat release rate | Heat Release[8] 2 min. total smoke release | Heat Release[8] Max. Smoke release rate | Blow moldability | Dynatup ® on Blow Molded Part |
|---|---|---|---|---|---|---|---|---|
| 1 | — | — | — | — | — | — | — | — |
| 2 | — | — | — | — | — | — | — | — |
| 3 | 45 | 9 | — | — | — | — | — | — |
| 4 | 28 | 7 | — | — | — | — | — | — |
| 5 | 24 | 14 | — | — | — | — | — | — |
| 6 | 39 | 28 | — | — | — | — | — | — |
| 7 | 34 | 29 | — | — | — | — | — | — |
| 8 | 22 | 16 | — | — | — | — | — | — |
| 9 | 28 | 12 | 25.2[9] | 77.3[9] | 43.1[9] | 104.5[9] | — | — |
| 10 | 50 | 26 | 35.7[10] | 67.1[10] | 70.2[10] | 125.3[10] | — | — |
| 11 | — | — | — | — | — | — | Good–Very Good | 8.70 |
| 12 | — | — | — | — | — | — | Fair | 16.7 |
| 13 | — | — | — | — | — | — | Fair–Good | 16.6 |
| 14 | — | — | — | — | — | — | Fair | 7.2 |
| 15 | — | — | — | — | — | — | — | — |
| 16 | — | — | — | — | — | — | — | — |
| 17 | 28 | 4 | 43.1[9] | 71.3[9] | 42.4[9] | 67.0[9] | Poor | — |
| 18 | — | — | — | — | — | — | — | — |

Footnotes to Table I
[1] Determined by ASTM procedure D648.
[2] Determined by ASTM procedure D256 (Rev. Notch test employs test bar with the notch on the side opposite impact).
[3] Gardner impact strength was determined on 2¼" × 2¼" × ⅛" samples supported by a 1½" diameter support ring. A steel dart having a diameter of ½" and a smooth rounded tip having a radius of curvature of ¼" was positioned above the test sample with the tip of the dart in contact with the sample. An eight-pound weight was allowed to fall a measured distance to strike the dart, forcing it into the sample. A "staircase" procedure was used to determine the work (height × weight) required to cause failure of the sample. The height of the weight above the impact end of the dart was changed incrementally (usually in increments of 1 inch) to find the work of failure for a given sample. Each test was replicated several times (usually 10 to 25 times) to provide statistically meaningful data. The mean value was determined statistically as the work required to cause failure of the sample in 50% of the tests. Failure was defined as breakage or perforation of the sample. The test was performed on injection molded samples conditioned for 48 hours at 50% relative humidity, room temperature.
[4] Scribed Gardner impact strength was determined by the same procedure described in footnote 3, except the lower surface of the test sample was lightly scribed with a knife in an X pattern.
[5] Test performed on extruded sheet samples.
[6] Test performed on extruded sheet samples which had been heat aged for more than 16 hours at 300–350° F.
[7] Dynatup ® testing measures the high-speed penetration properties of plastics using load and displacement sensors. The testing was performed substantially by ASTM procedure D3763-85 using a Dynatup ® instrument. Tests were performed on a 4" diameter, ⅛" thick injection molded disc supported by a 3" diameter support ring. Five to ten replicates of each sample were tested to determine the mean work (ft.-lb.) required to cause sample failure.
[8] Tests performed at Ohio State University according to procedures described in 14 C.F.R. Part 25.
[9] Tests performed on 0.060 thick injection molded samples.
[10] Tests performed on 0.060" thick extruded sheet.
[11] Re-extruded control.

We claim:
1. A polymer blend which comprises a polyetherimide component and from about 2 wt. % to about 90 wt. % of a siloxane polyetherimide copolymer component, wherein the polyetherimide component is comprised of repeating units of the formula

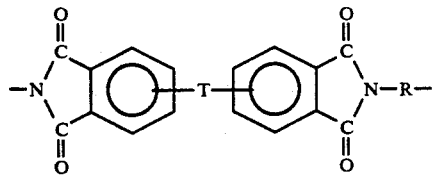

and the siloxane polyetherimide copolymer component consists essentially of repeating units of the formula

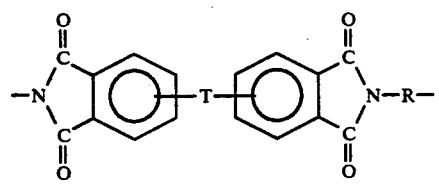

and repeating units of the formula

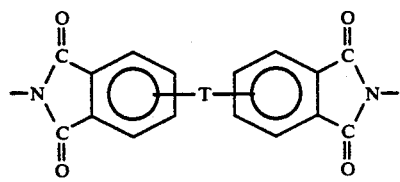

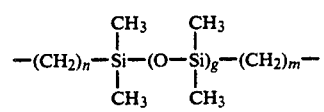

and contains from about 20 to about 50 mol % of organosiloxane-containing units;

where T is —O— or a group of the formula —O—Z—O— wherein the divalent bonds of the —O— or the —O—Z—O— group are in the 3,3', 3,4', 4.3' or 4,4' positions;

Z is a member of the class consisting of (A):

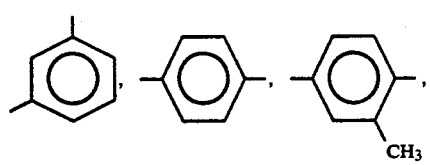

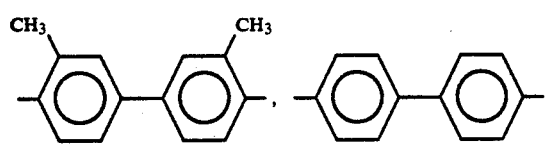

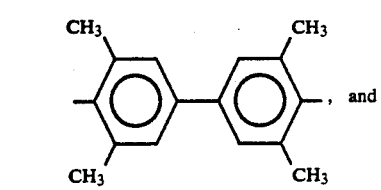, and

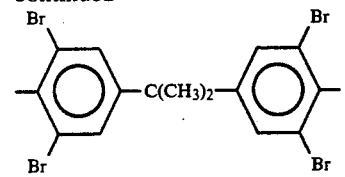

and (B) divalent organic radicals of the general formula

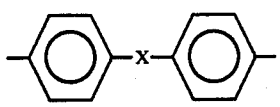

where X is a member selected from the group consisting of divalent radicals of the formulas

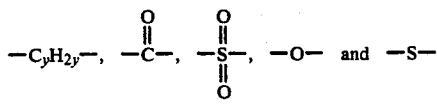

where y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, and (c) divalent radicals of the general formula

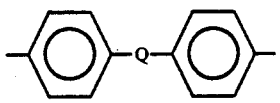

where Q is a member selected from the group consisting of

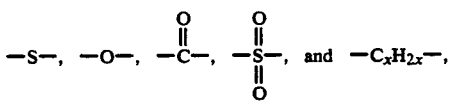

and x is an integer from 1 to about 5;

n and m independently are integers from 1 to about 10 and g is an integer from 5 to about 25.

2. The polymer blend of claim 1, wherein the polyetherimide further contains repeating units of the formula

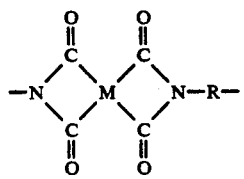

wherein R is as defined in claim 1 and M is selected from the group consisting of

13

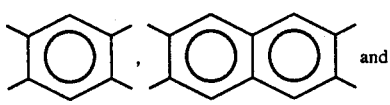, 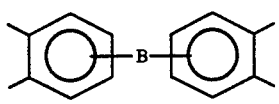 and where B is —S— or

.

3. The polymer blend of claim 1, wherein n and m are integers from 1 to about 5.

4. The polymer blend of claim 3, wherein g has an average value from 9 to about 20.

5. The polymer blend of claim 1, wherein the organosiloxane-containing repeating unit constitutes from about 25 to about 40 mole % of the siloxane polyetherimide copolymer.

6. A polymer blend which comprises a polyetherimide and from about 2 wt. % to about 90 wt. % of a siloxane polyetherimide copolymer, wherein the polyetherimide is comprised of repeating units of the formula

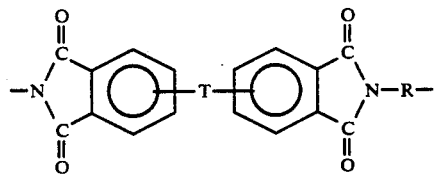

and wherein the siloxane polyetherimide copolymer consists essentially of repeating units of the formula

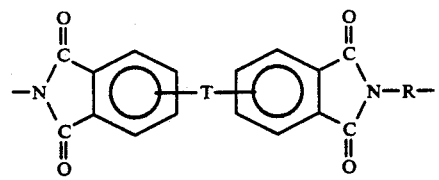

and repeating units of the formula

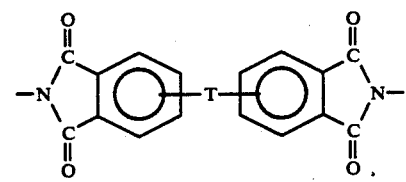

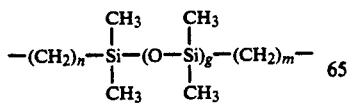

and repeating units of the formula

14

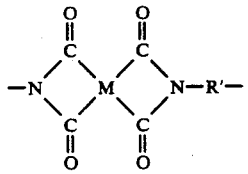

wherein M is selected from the group consisting of

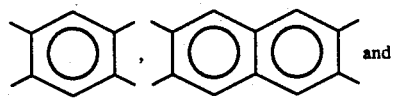, and

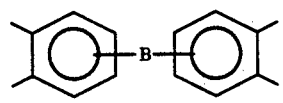

where B is —S— or

and R' is R or a group of the formula

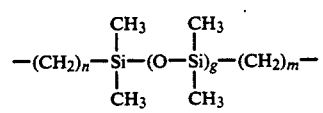

and said siloxane polyetherimide copolymer comprises from about 20 to about 50 mol % of organosiloxane-containing units; where T is —O— or a group of the formula

wherein the divalent bounds of the —O— or the —O—Z—O— group are in the 3,3', 3,4', 4,3' or 4,4' positions; Z is a member of the class consisting of (A):

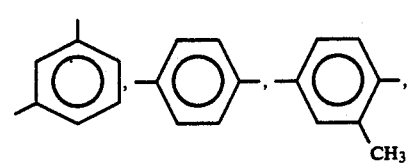

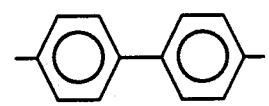

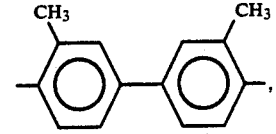

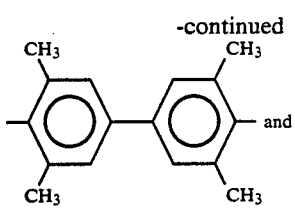

and

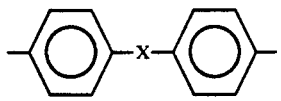

and (B) divalent organic radicals of the general formula

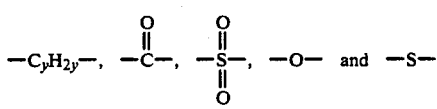

where X is a member selected from the group consisting of divalent radicals of the formulas $$-C_yH_{2y}-, \quad -\overset{O}{\underset{\|}{C}}-, \quad -\overset{O}{\underset{\underset{\|}{O}}{\overset{\|}{S}}}-, \quad -O- \text{ and } -S-$$

where Y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, and (c) divalent radicals of the general formula

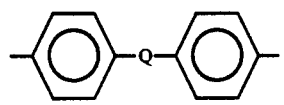

where Q is a member selected from the group consisting of $$-S-, \quad -\overset{O}{\underset{\|}{C}}-, \quad -O-, \quad -\overset{O}{\underset{\underset{\|}{O}}{\overset{\|}{S}}}-, \text{ and } -C_xH_{2x}-$$

and x is an integer from 1 to about 5; and n and m independently are integers from 1 to about 10 and g is an integer from about 5 to about 25.

7. The polymer blend of claim 6, wherein the polyetherimide further comprises repeating units of the formula

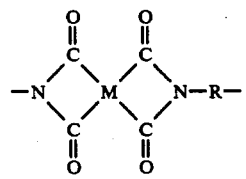

wherein R and M are as defined in claim 6.

8. The polymer blend of claim 1, 2, 3 or 6 wherein the siloxane polyetherimide copolymer is a substantially random copolymer.

9. The polymer blend of claim 1, 2, 3 or 6 wherein the siloxane polyetherimide copolymer is a block copolymer.

10. The polymer blend of claim 1, 2, 3 or 6 wherein the siloxane polyetherimide copolymer is an alternating copolymer.

11. The polymer blend of claim 1, 2, 3 or 6 which contains from about 2% to about 75% by wt. of the siloxane polyetherimide copolymer.

12. The polymer blend of claim 1, 2, 3 or 6 which contains from about 5% to about 30% by wt. of the siloxane polyetherimide copolymer.

13. The polymer blend of claim 12, wherein the polyetherimide consists essentially of repeating units of the formula

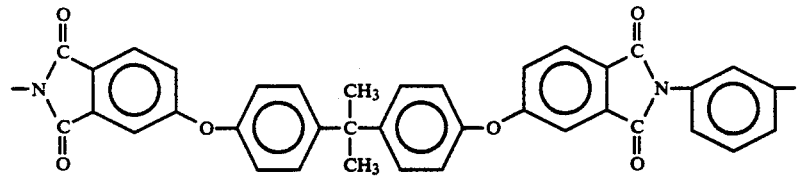

14. The polymer blend of claim 6, wherein the siloxane polyetherimide copolymer consists essentially of repeating units of the formula

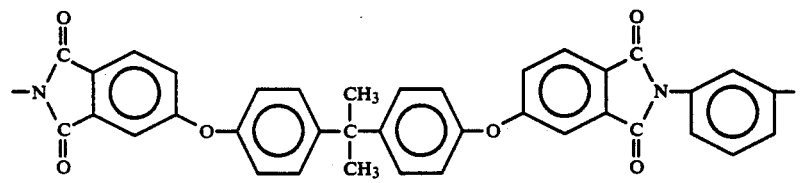

and

-continued
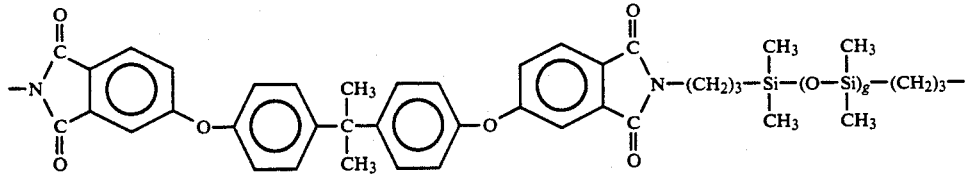
wherein g has an average value of from about 9 to about 20.
15. The polymer blend of claim 12, which further contains fillers, pigments, reinforcing agents or mixtures thereof.
* * * * *

UNITED STATES PATENT AND TRADEMARK OFFICE
CERTIFICATE OF CORRECTION

PATENT NO. : 5,106,915

DATED : April 21, 1992

INVENTOR(S) : John Rock et al.

It is certified that error appears in the above-identified patent and that said Letters Patent is hereby corrected as shown below:

On the title page:
   Item [56] add the reference --2,236,887 France--.

Col. 16, line 43 (claim 14) "6" should be --12--.

Signed and Sealed this

Twenty-first Day of September, 1993

Attest:

BRUCE LEHMAN

Attesting Officer

Commissioner of Patents and Trademarks